United States Patent
Curcio

(10) Patent No.: US 8,391,284 B2
(45) Date of Patent: Mar. 5, 2013

(54) USAGE OF FEEDBACK INFORMATION FOR MULTIMEDIA SESSIONS

(75) Inventor: Igor Danilo Diego Curcio, Tampere (FI)

(73) Assignee: Nokia Corporation, Espoo (FI)

( * ) Notice: Subject to any disclaimer, the term of this patent is extended or adjusted under 35 U.S.C. 154(b) by 385 days.

(21) Appl. No.: 12/597,223

(22) PCT Filed: Apr. 22, 2008

(86) PCT No.: PCT/IB2008/000988
§ 371 (c)(1),
(2), (4) Date: Oct. 23, 2009

(87) PCT Pub. No.: WO2008/129408
PCT Pub. Date: Oct. 30, 2008

(65) Prior Publication Data
US 2010/0135290 A1    Jun. 3, 2010

Related U.S. Application Data

(60) Provisional application No. 60/907,938, filed on Apr. 23, 2007.

(51) Int. Cl.
H04L 12/56        (2006.01)

(52) U.S. Cl. ........ 370/389; 370/252; 370/392; 370/465; 709/232

(58) Field of Classification Search ................ 370/252, 370/392, 469, 229, 389, 465
See application file for complete search history.

(56) References Cited

U.S. PATENT DOCUMENTS

| | | | |
|---|---|---|---|
| 7,756,108 | B2 | 7/2010 | Curcio et al. ................ 370/352 |
| 2004/0165527 | A1* | 8/2004 | Gu et al. ...................... 370/229 |
| 2006/0050705 | A1* | 3/2006 | Kim ............................. 370/392 |
| 2006/0069799 | A1* | 3/2006 | Hundscheidt et al. ....... 709/232 |
| 2006/0187927 | A1* | 8/2006 | MeLampy et al. ........... 370/389 |
| 2007/0153914 | A1* | 7/2007 | Hannuksela et al. ... 375/240.26 |
| 2010/0020713 | A1* | 1/2010 | Frankkila ..................... 370/252 |

OTHER PUBLICATIONS

Non-compound RTCP in MTSI, Ericsson, Tdoc S4-070263, 3GPP SA4#43, Rennes, France, Apr. 23-27, 2007.
Ott et al., "Extended RTP Profile for Real-Time Transport Control Protocol (RTCP) Based Feeback (RTP/AVPF)" IETF Standard Internet Engineering Task Force, IETF, CH. Jul. 1, 2006.
I. Johansson, M. Westerlund, Support for non-compound RTCP in RTCP AVPF profile, opportunities and consequences, IETF draft, draft-johansson-avt-rtcp-avpf-non-compound-01, Mar. 5, 2007.
RTP-RTCP Multiplexing, Three, Tdoc S2-033127, 3GPP SA2#34, Brussels, Belgium, Aug. 25-29, 2003.
RTP-RTCP Separation, Three, Tdoc S2-033128, 3GPP SA2#34, Brussels, Belgium, Aug. 25-29, 2003.
RTCP Removal, Three, Tdoc S2-033136, 3GPP SA2#34, Brussels, Belgium, Aug. 25-29, 2003.

(Continued)

Primary Examiner — Andrew Chriss
Assistant Examiner — Mohamed Kamara
(74) Attorney, Agent, or Firm — Harrington & Smith

(57) ABSTRACT

An apparatus and method configure RTCP packets in a control feedback handling in multimedia sessions. The apparatus and method are configured to provide sending of any RTCP individual packet as a non-compound RTCP packet an order within a time interval. The apparatus and method are configured so that an excessive length of compound RTCP packets are handled by fragmenting each compound RTCP packet in smaller non-compound packets and sending it spaced over time. The apparatus and method guarantee RTCP non-compound packets to provide an equivalent functionality as the RTCP compound packets by providing the same information to the receiver, and the receiver does not lack any feedback information. The apparatus and method are also configured to use semi-compound RTCP packets, where at least two non-compound/individual RTCP packets (but less than all the non-compound/individual RTCP packets that would be sent as compound packet) are sent together as a semi-compound RTCP packet.

20 Claims, 8 Drawing Sheets

OTHER PUBLICATIONS

Schulzrinne etl al., "RTP: A Transport Protocol for Real-Time Applications", IETF RFC 3550, Jul. 2003.
Radio Link Control (RLC) Protocol Specification, 3GPP TS 25.322 (Release 7), Mar. 2006.
Change Request on "addition of non-compound RTCP", Ericsson, Tdoc S4-070264, 3GPP SA4#43, Rennes, France, Apr. 23-27, 2007.
Westerlund et al., "Support for non-compound RTCP in RTCP AVPF Profile, Opportunities and Consequences" IETF Standard Working Draft, Internet Engineering Task Force, IETF, Ch No. 1, Mar. 5, 2007.
Handling of variable data rates for conversational IMS, Siemens, Tdoc R2-030237, 3GPP RAN2#34, Sophia Antipolis, France, Feb. 17-21, 2003.
RTCP Handling: Separation or Multiplexing, Alcatel, Tdoc S2-033598, 3GPP SA2#35, Bangkok, Thailand, Oct. 27-21, 2003.
3GPP, Multimedia Telephony; media handling and interaction, Release 7, TS 26.114, Mar. 2007.
RTCP optimization usage for VoIMS, Nokia, Tdoc 54-030770, 3GPP SA4#29 meeting, Tampere, Finland, Nov. 24-28, 2003.
International Search Report and Written Opinion of the International Searching Authority for PCT Application No. PCT/IB2008/000988, dated Apr. 24, 2009, 19 pages.
RAB support for IMS, 3GPP TR 25.xxx V0.0.0 (Nov. 2003) 3rd Generation Partnership Project; Technical Specification Group Radio Access Network; RAB support for IMS (Release 6) (13 Pages).

\* cited by examiner dia sessions.

USAGE OF FEEDBACK INFORMATION FOR MULTIMEDIA SESSIONS

RELATED APPLICATION

This application was originally filed as PCT Application No. PCT/IB2008/000988 filed Apr. 22, 2008 which claims priority to U.S. Provisional Application No. 60/907,938 filed Apr. 23, 2007.

CROSS REFERENCE TO RELATED APPLICATIONS

This application claims priority of U.S. Provisional Patent Application Ser. No. 60/907,938, filed on Apr. 23, 2007. The subject matter of the earlier filed application is hereby incorporated by reference.

BACKGROUND OF THE INVENTION

1. Field of the Invention

The present invention relates to an apparatus and method to transmit voice and other multimedia information over a network. In particular, an apparatus and method are provided which configure real time transport control protocol packets in a control feedback handling in multimedia sessions.

2. Description of the Related Art

Multimedia data is distributed by, for example, multimedia protocols. Real-time transport protocol (RTP) uses universal datagram protocol (UDP) as a transport protocol appropriate for transmission of streaming data; because UDP provides a fast transmission although not reliable like it is the case by transmission control protocol (TCP). Hypertext transport protocol (HTTP) and real-time streaming protocol (RTSP) run over the reliable TCP. The RTSP provides session control for streaming sessions. HTTP can be used for transmission of still images, bitmap graphics and text.

The RTP can provide end-to-end network transport functions suitable for applications transmitting real-time data, such as audio, video or simulation data, over multicast or unicast network services. The functions provided by RTP include payload type identification, sequence numbering, timestamping, and delivery monitoring. The RTP contains a related RTP Control Protocol (RTCP) augmenting the data transport, which is used to monitor a quality of service (QoS) and to convey information about the participants in an ongoing session. Each media stream in a conference is transmitted as a separate RTP session with a separate RTCP stream.

RTP adds a time stamp and a sequence number to each UDP packet in a special RTP header. The time stamp is related to the sampling or the presentation or composition time of the media carried in the payload of the RTP packet. It is used for playing back media at the correct speed, and together with RTCP, it can be used for synchronizing the presentation of other streaming media. A payload specification defines the interpretation of the time stamp and other RTP fields. The recipient can use the sequence number to detect the loss of packets statistics on loss can be reported to the server by means of RTCP.

RTCP reports are capable of providing statistics about the data received from a particular source, such as the number of packets lost since the previous report, the cumulative number of packets lost, the interarrival jitter, etc. The RTCP control protocol is based on the periodic transmission of control packets to all participants in the session, using the same distribution mechanism as the data packets. The underlying protocol provides multiplexing of the data and control packets, for example using separate port numbers with UDP.

An apparatus and method are needed in which an excessive length of compound RTCP packets may be handled by fragmenting each compound RTCP packet in smaller non-compound packets and sending it spaced over time. The apparatus and method would guarantee RTCP non-compound packets to provide an equivalent functionality as the RTCP compound packets by providing the same information to the receiver (SR, RR, SDES, etc.), and the receiver would not lack any feedback information.

SUMMARY OF THE INVENTION

Embodiments of the invention can provide an apparatus, which includes a controller configured to define a first packet as a non-compound real-time transport control protocol packet. The controller is further configured to define the non-compound real-time transport control protocol packet to comprise at least one of a sender report, a receiver report, a session description protocol security description for media streams, an application defined real-time transport control protocol packet, or an individual real-time transport control protocol packet. The apparatus further includes a transmitter configured to transmit the non-compound real-time transport control protocol packet in a sample order within a defined interval.

Furthermore, embodiments of the invention can provide a method, which includes configuring a first packet as a non-compound real-time transport control protocol packet. The method further includes configuring the non-compound real-time transport control protocol packet to comprise at least one of a sender report, a receiver report, a session description protocol security description for media streams, an application defined real-time transport control protocol packet, or an individual real-time transport control protocol packet. The method further includes transmitting the non-compound real-time transport control protocol packet in a sample order within a defined time interval.

Furthermore, embodiments of the invention can provide an apparatus, which includes a controller configured to define a real-time transport control protocol packet as either a compound real-time transport control protocol packet or a non-compound real-time transport control protocol packet. The controller is further configured to define a limit on a size of a real-time transport control protocol packet to be at most as large as N times a size of a speech packet size. The size of the speech packet size corresponds to a highest of speech codec modes used in a session.

Furthermore, embodiments of the invention can provide a method, which includes defining a real-time transport control protocol packet as either a compound real-time transport control protocol or a non-compound real-time transport control protocol. The method further includes determining whether the speech packet size includes headers; if the speech packet size includes headers. The method further includes determining whether the headers are compressed. The method further includes defining a limit on the size of the real-time transport control protocol packet to be at most as large as N times the size of the speech packet size. The size of the speech packet size corresponds to a highest of the speech codec modes used in a session.

Furthermore, embodiments of the invention can provide an apparatus, which includes a receiver configured to receive a non-compound real-time transport control protocol packet from a receiver terminal. The apparatus further includes a controller configured to insert information in a real time transport protocol packet and/or the non-compound real-time transport control protocol packet. The information includes a positive acknowledgement indicative that the sender terminal has received the non-compound real-time transport control protocol packet. The apparatus further includes a transmitter configured to transmit the real time transport protocol packet and/or the non-compound real-time transport control protocol packet to the receiver terminal. The receiver terminal determines that the information comprises the positive acknowledgement indicative that the sender terminal has received the non-compound real-time transport control protocol packet.

Furthermore, embodiments of the invention can provide a method, which includes receiving a non-compound real-time transport control protocol packet, at a sender terminal. The method further includes, upon reception of the first non-compound real-time transport control protocol packet, inserting information in a real time transport protocol packet and/or the non-compound real-time transport control protocol packet. The information includes a positive acknowledgement indicative that the sender terminal has received the non-compound real-time transport control protocol packet. The method includes transmitting the real time transport protocol packet and/or the non-compound real-time transport control protocol packet to a receiver terminal. The receiver terminal determines that the information comprises the positive acknowledgement indicative that the sender terminal has received the non-compound real-time transport control protocol packet.

Furthermore, embodiments of the invention can provide an apparatus, which includes a determiner configured to determine that a radio bearer allows the sending of more than one non-compound real-time transport control protocol packet, but does not allows the sending of a compound real-time transport control protocol packet. The apparatus further includes a controller configured to define a real-time transport control protocol packet as a semi-compound real-time transport control protocol packet. The semi-compound real-time transport control protocol packet includes at least two non-compound real-time transport control protocol packets, but less than all the non-compound real-time transport control protocol packets that would be sent as a compound real-time transport control protocol packet. The apparatus further includes a transmitter configured to transmit the semi-compound real-time transport control protocol packet.

Furthermore, embodiments of the invention can provide a method, which includes determining that a radio bearer allows the sending of more than one non-compound real-time transport control protocol packet, but does not allows the sending of a compound real-time transport control protocol packet. The method further includes configuring a real-time transport control protocol packet as a semi-compound real-time transport control protocol packet. The semi-compound real-time transport control protocol packet includes at least two non-compound real-time transport control protocol packets, but less than all the non-compound real-time transport control protocol packets that would be sent as a compound real-time transport control protocol packet. The method further includes transmitting the semi-compound real-time transport control protocol packet.

Furthermore, embodiments of the invention can provide a computer program embodied on a computer-readable medium, the computer program configured to control a processor to implement a method. The method includes configuring a first packet as a non-compound transport control protocol packet. The method further includes configuring the non-compound transport control protocol packet to comprise at least one of a sender report, a receiver report, a session description protocol security description for media streams, an application defined real-time transport control protocol packet, or an individual real-time transport control protocol packet. The method further includes transmitting the non-compound transport control protocol packet in a sample order within a defined time interval.

Furthermore, embodiments of the invention can provide a computer program embodied on a computer-readable medium, the computer program configured to implement a method. The method includes defining a real-time transport control protocol packet as either a compound real-time transport control protocol or a non-compound real-time transport control protocol. The method further includes determining whether the speech packet size includes headers. The method further includes, if the speech packet size includes headers, determining whether the headers are compressed. The method further includes defining a limit on the size of the real-time transport control protocol packet to be at most as large as N times the size of the speech packet size. The size of the speech packet size corresponds to a highest of the speech codec modes used in a session.

Furthermore, embodiments of the invention can provide a computer program embodied on a computer-readable medium, the computer program configured to implement a method. The method includes receiving a non-compound real-time transport control protocol packet, at a sender terminal. The method further includes, upon reception of the first non-compound real-time transport control protocol packet, inserting information in a real time transport protocol packet and/or the non-compound real-time transport control protocol packet. The information includes a positive acknowledgement indicative that the sender terminal has received the non-compound real-time transport control protocol packet. The method includes transmitting the real time transport protocol packet and/or the non-compound real-time transport control protocol packet to a receiver terminal. The receiver terminal determines that the information comprises the positive acknowledgement indicative that the sender terminal has received the non-compound real-time transport control protocol packet.

Furthermore, embodiments of the invention can provide a computer program embodied on a computer-readable medium, the computer program configured to implement a method. The method includes determining that a radio bearer allows the sending of more than one non-compound real-time transport control protocol packet, but does not allows the sending of a compound real-time transport control protocol packet. The method further includes configuring a real-time transport control protocol packet as a semi-compound real-time transport control protocol packet. The semi-compound real-time transport control protocol packet includes at least two non-compound real-time transport control protocol packets, but less than all the non-compound real-time transport control protocol packets that would be sent as a compound real-time transport control protocol packet. The method further includes transmitting the semi-compound real-time transport control protocol packet.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

One of the functions of RTCP is to provide feedback on the quality of the data distribution. This is a part of the RTP's role as a transport protocol and is related to the flow and congestion control functions of other transport protocols. The feedback may be directly useful to diagnose faults in the distribution. Sending reception feedback reports to all participants allows one who is observing problems to evaluate whether those problems are local or global. With a distribution mechanism like IP multicast, it is also possible for an entity such as a network service provider who is not involved in the session to receive the feedback information and act as a third-party monitor to diagnose network problems. This feedback function is performed by the RTCP sender and receiver reports. The RTCP specification requires that all participants send RTCP packets, therefore the rate must be controlled in order for RTP to scale up to a large number of participants. By having each participant sending its control packets to all the others, each can independently observe the number of participants. This number is used to calculate the rate at which the packets are sent.

Several alternatives have been considered in the past years in other several 3GPP Working Groups to overcome a basic problem in VoIMS (voice over Internet protocol multimedia subsystem) of an uncontrolled nature of the RTCP traffic, and its possible impact on the RTP traffic, which carries voice data:

1. Removal of RTCP for VoIMS
2. RTP and RTCP carried over separate PDP contexts and radio bearers
3. RTP frame stealing (prioritizing RTCP over RTP)

In addition to the previous alternatives, there have been in the past also other proposals:

4. Segmentation and concatenation over the radio interface
5. RB/TrCH/PhyCH Reconfiguration
6. Allocation of secondary scrambling code These methods are primarily for the downlink only (it is assumed that in uplink the bearer can be over-dimensioned).

In general, the three above-mentioned radio access level solutions are specific to UTRAN (i.e., not applicable to GERAN, e.g., the usage of the secondary scrambling code), and/or they are not applicable in legacy networks (e.g., the reconfiguration).

Recently, a proposal to use RTCP non-compound packets has been done in Internet engineering task force (IETF) and third generation partnership project (3GPP). The RTP protocol mandates the usage of compound RTCP packets. Compound RTCP packets are made of at least two individual RTCP packets that contain at least a Sender Report (SR) or Receiver Report (RR), and an SDES packet with the CNAME field.

Some proposals suggest to remove the constraints of sending compound RTCP packets and to allow sending non-compound RTCP packets to reduce the size of RTCP packets over a mobile network link and remove or decrease the side effects given by large RTCP packets.

Figure 1:
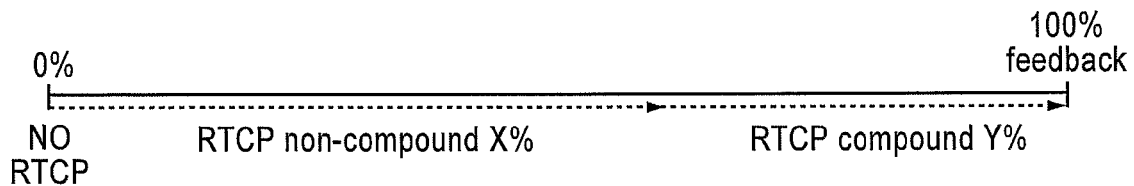
FIG. 1 illustrates a graphical representation of a real time transport protocol (RTP) control protocol (RTCP) feedback.

FIG. 1 illustrates a graphical representation of the RTCP feedback possibilities within multimedia telephony service for IP multimedia subsystem (MTSI) speech-only sessions. Note that the sum of x % and y % makes the total 100% feedback within a session.

Reference will now be made in detail to preferred embodiments of the present invention, examples of which are illustrated in the accompanying drawings. In accordance with an embodiment of the present invention, there is provided an apparatus, a system, and a method to define a location configuration protocol information element within a network.

Embodiments of the present invention relate to an apparatus and method to transmit voice and other multimedia information over a network. In particular, an apparatus and method can be provided configuring real time transport control protocol packets in voice over Internet protocol (VoIP) control feedback handling in multimedia sessions.

Embodiments of the present invention relate to an apparatus and method configuring real time transport control protocol packets in a control feedback handling in multimedia sessions. The apparatus and method can also be configured to provide sending of any real time transport control protocol individual packet as a non-compound real time transport control protocol packet an order within a time interval. The apparatus and method can be further configured so that an excessive length of compound real time transport control protocol packets are handled by fragmenting each compound real time transport control protocol packet in smaller non-compound packets and sending it spaced over time. The apparatus and method can guarantee real time transport control protocol non-compound packets to provide an equivalent functionality as the real time transport control protocol compound packets by providing the same information to the receiver, and the receiver does not lack any feedback information.

Embodiments of the present invention relate to an apparatus and method to use semi-compound real time transport control protocol packets, where at least two non-compound/individual real time transport control protocol packets (but less than all the non-compound/individual real time transport control protocol packets that would be sent as compound packet) are sent together as a semi-compound real time transport control protocol packet.

The framework of an embodiment of the invention is the transmission system of real-time voice related data over VoIP. In third generation partnership project IP multimedia subsystem (3GPP IMS) networks, this framework is referred to as VoIMS (voice over Internet protocol multimedia subsystem) or MTSI. In 3GPP IMS (IP multimedia subsystem) networks, this is also called VoIMS or MTSI. Voice calls can be either point-to-point or conferencing calls. The present invention may also apply to point-to-multipoint voice connections and video telephony connections, where also other medium other than voice may be carried (for instance, video).

Figure 2:
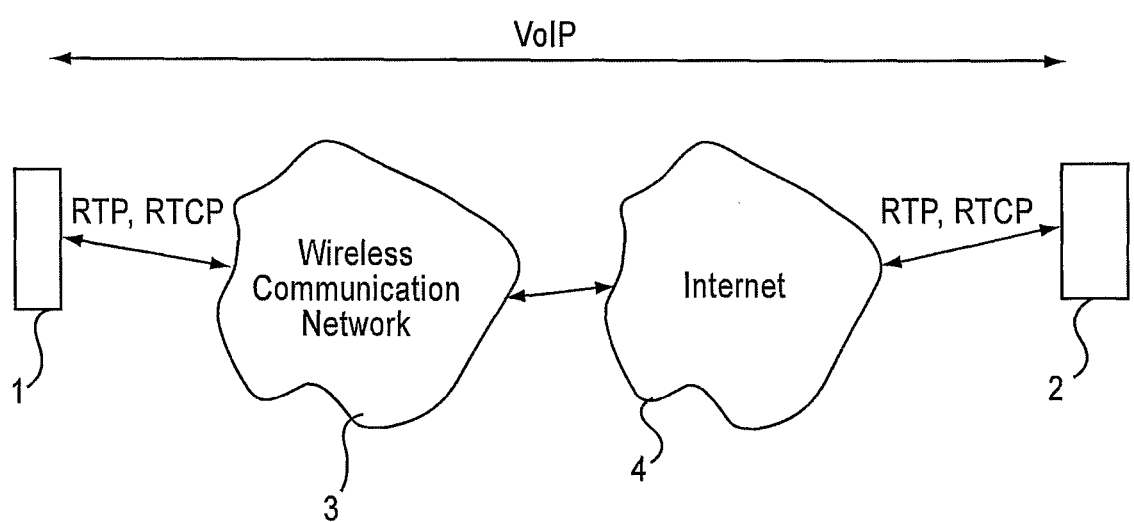
FIG. 2 illustrates an example of a conversation session between two terminals using VoIP.

FIG. 2 illustrates an example of a conversation session between two terminals 1, 2 using VoIP. In this non-limiting example, the terminals 1, 2 are communicating with each other via a wireless communication network 3 and the internet 4. The communication is based on packet transmission using a real-time transport protocol (RTP). The RTP packets are encapsulated in packets of a lower layer protocol, such as Internet Protocol (IP). A packet data protocol (PDP) context is created for the VoIP session. The wireless communication network reserves some network resources for the PDP context. These network resources are called as radio bearers in third generation partnership project (3GPP) wireless communication systems. During the conversation audio information such as speech is converted into digital form in the terminals 1, 2. The digital data is then encapsulated to form packets which can be transmitted via the networks to the terminal on the other side of the connection. That terminal receives the packets and performs steps to recover the audio information.

In the following, it is assumed that the RTP and real-time control protocol (RTCP) traffic are carried in the same PDP context and radio bearer.

The RTP can provide end-to-end delivery services for data with real-time characteristics, such as interactive audio and video. Those services include payload type identification, sequence numbering, time stamping and delivery monitoring. Applications can run RTP on top of UDP to make use of its multiplexing and checksum services; both protocols contribute parts of the transport protocol functionality. However, RTP may be used with other suitable underlying network or transport protocols. RTP supports data transfer to multiple destinations using multicast distribution if provided by the underlying network.

The audio conferencing application used by each conference participant can send audio data in small chunks of, for example, 20 ms duration. Each chunk of audio data is preceded by an RTP header; RTP header and data are in turn contained in a UDP packet. The RTP header indicates what type of audio encoding (such as AMR, AMR-WB, PCM, ADPCM or LPC) is contained in each packet so that senders can change the encoding during a conference, for example, to accommodate a new participant that is connected through a low-bandwidth link or react to indications of network congestion.

If both audio and video media are used in a conference, they can be transmitted as separate RTP sessions. That is, separate RTP and RTCP packets can be transmitted for each medium using two different UDP port pairs and/or multicast addresses. There is no direct coupling at the RTP level between the audio and video sessions, except that a user participating in both sessions should use the same distinguished (canonical) name in the RTCP packets for both so that the sessions can be associated.

One motivation for this separation is to allow some participants in the conference to receive only one medium if they choose. Despite the separation, synchronized playback of a source's audio and video can be achieved using timing information carried in the RTCP packets for both sessions.

An RTP packet is a data packet which includes the fixed RTP header, a possibly empty list of contributing sources, and the payload data. RTP payload is the data transported by RTP in a packet, for example audio samples or compressed video data. Some underlying protocols may require an encapsulation of the RTP packet to be defined. Typically one packet of the underlying protocol contains a single RTP packet, but several RTP packets may be contained if permitted by the encapsulation method.

The RTP control protocol (RTCP) is based on the periodic transmission of control packets to all participants in the session, using the same distribution mechanism as the data packets. The underlying protocol should provide multiplexing of the data and control packets, for example using separate port numbers with UDP. RTCP can perform numerous functions, including:

1. Providing feedback on the quality of the data distribution. This is a part of the RTP's role as a transport protocol and is related to the flow and congestion control functions of other transport protocols. The feedback may be directly useful for control of adaptive encodings, but experiments with IP multicasting have shown that it is also critical to get feedback from the receivers to diagnose faults in the distribution. Sending reception feedback reports to all participants allows one who is observing problems to evaluate whether those problems are local or global. With a distribution mechanism like IP multicast, it is also possible for an entity such as a network service provider who is not otherwise involved in the session to receive the feedback information and act as a third-party monitor to diagnose network problems. This feedback function is performed by the RTCP sender and receiver reports.

2. RTCP carries a persistent transport-level identifier for an RTP source called the canonical name or CNAME.

3. The first two functions can require that all participants send RTCP packets, therefore the rate must be controlled in order for RTP to scale up to a large number of participants. By having each participant send its control packets to all the others, each can independently observe the number of participants. This number is used to calculate the rate at which the packets are sent.

4. A fourth, optional function is to convey minimal session control information, for example participant identification to be displayed in a user interface of a terminal.

An RTCP packet is a control packet which includes a fixed header part similar to that of RTP data packets, followed by structured elements that vary depending upon the RTCP packet type. Typically, multiple RTCP packets are sent together as a compound RTCP packet in a single packet of the underlying protocol; this is enabled by the length field in the fixed header of each RTCP packet.

The Internet, like other packet networks, occasionally loses and reorders packets and delays them by variable amounts of time. To cope with these impairments, the RTP header contains timing information and a sequence number that allow the receivers to reconstruct the timing produced by the source, so that, for example, chunks of audio are contiguously played out the speaker every 20 ms. This timing reconstruction is performed separately for each source of RTP packets in the conference. The sequence number can also be used by the receiver to estimate how many packets are being lost.

Figure 3:
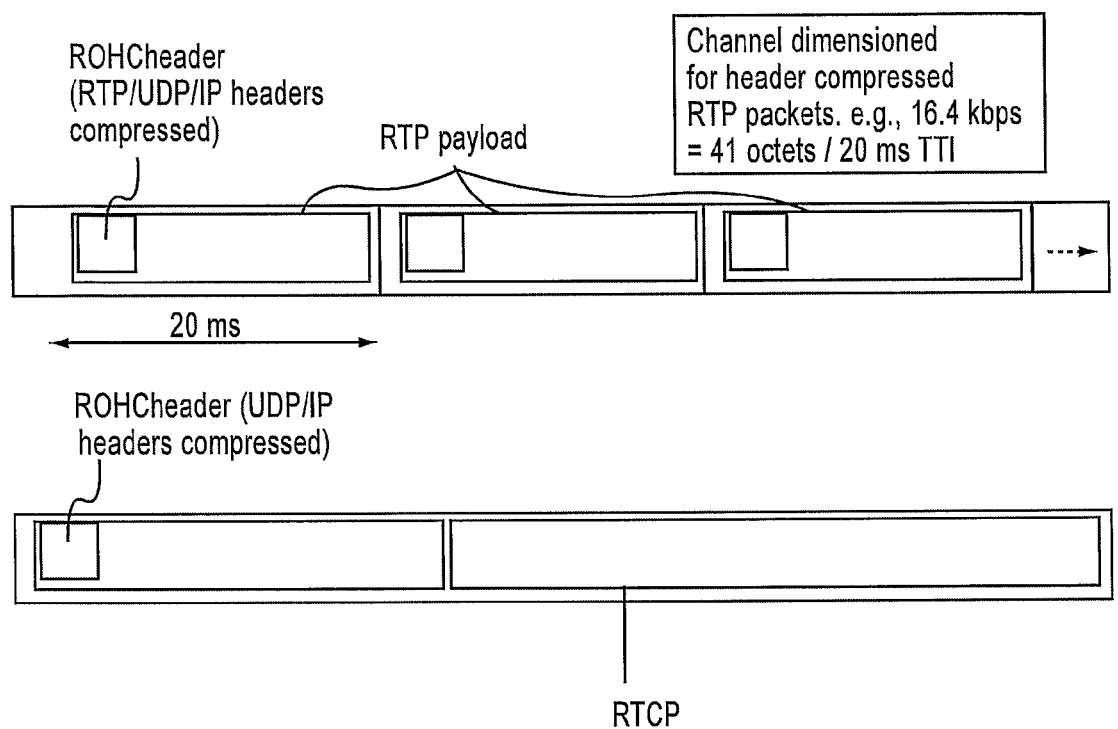
FIG. 3 illustrates the size differences between RTP and RTCP packets.

FIG. 3 illustrates RTP and RTCP traffic inter-dependency in VoIMS. It is assumed that RTP and RTCP traffic are carried in the same PDP context and radio bearer.

The basic problem in VoIMS is given by the uncontrolled nature of the RTCP traffic, and its possible impact on the RTP traffic, which carries voice data. As illustrated in FIG. 3, RTP/UDP/IPv6 headers of the RTP packets are compressed using ROHC RTP/UDP/IP profile, and the UDP/IPv6 headers of the RTCP packets using ROHC UDP/IP profile.

FIG. 3 shows that, the length of RTCP packets can be much larger than the length of RTP packets. Every RTP packet is sent during one 20 ms Transmission Time Interval (TTI). The transmission of one RTCP packet covers multiple transmission time intervals. Since the transmission of RTP and RTCP occurs on the same radio bearer, RTCP packets may cause RTP packets to be delayed or even lost (depending on the RLC discard timer). Ultimately, this produces impairment of the perceived speech quality.

In the above described example it is assumed that the bearer is dimensioned for (maximum) 12.2 kbps AMR mode (RTP payload 32 bytes), so that there is room for ROHC First Order (FO) header and PDCP header, together maximum of 9 bytes.

It is noted here that the maximum size of the FO header depends on the ROHC implementation. Also, occasional ROHC feedback headers may increase the size of the ROHC header. The dimensioning of the bearer may be somewhat higher or lower, depending on the assumed ROHC header size and depending on the allowed delay.

The example presented the case in UTRAN, with usage of ROHC. The same conclusions can be drawn without usage of ROHC. A similar situation holds also in GSM Edge Radio Access Network (GERAN) networks: instead of the TTI concept, there are a fixed number of time slots reserved for the transmission of the header compressed RTP packet once in 20 ms (e.g., one time slot in each of the consecutive 4 or 5 TDMA frames of 4.615 ms duration).

Figure 4:
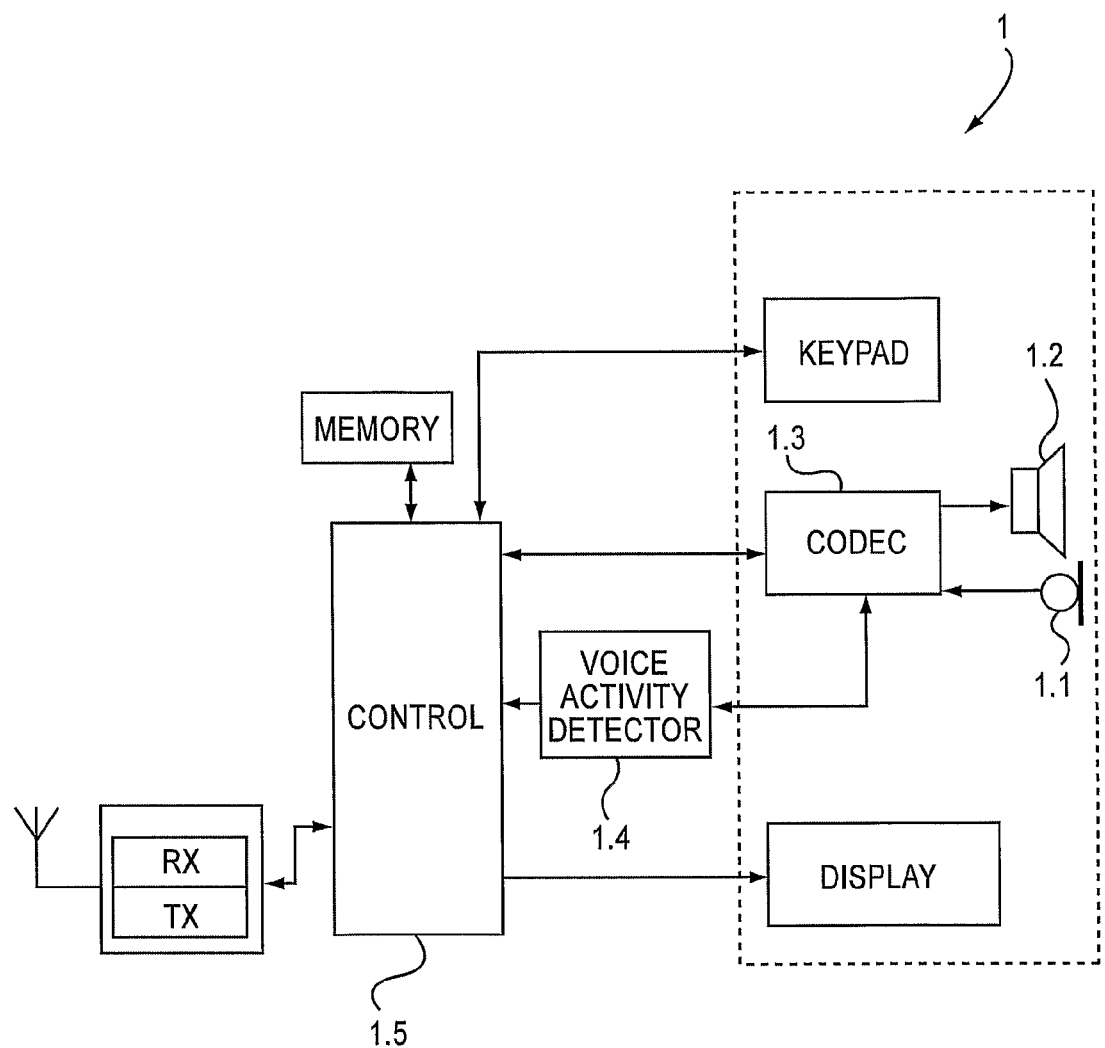
FIG. 4 depicts an example embodiment of a terminal according to the present invention.

FIG. 4 depicts an example embodiment of a terminal according to the present invention. The terminal 1 includes an audio-to-electric converter 1.1 such as a microphone, an electric-to-audio converter 1.2 such as a loudspeaker, and a codec 1.3 for performing encoding and decoding operations for audio. The terminal also includes a voice activity detector 1.4 which tries to determine whether there is speech going on or pauses in the speech (i.e., silence). The determination may be performed on the basis of analog signal from the signals received from the audio-to-electric converter 1.1, or on the basis of digital speech information provided by the codec 1.3. In the latter case, the codec, which can be adaptive multi-rate (AMR) codec or adaptive multi-rate wireband (AMR-WB) codec, forms frames of the speech and attaches a frame type indication to the frame. Therefore, silence is detectable by the sending terminal by e.g. looking at the Frame Type field in the payload Table of Contents of the AMR or AMR-WB RTP streams. The terminal can also include a control block 1.5 to control the operations of the terminal 1.

It is possible to send RTCP packets during the silence periods with no impact on the speech quality. During the silence periods, RTCP packets of normal size can be used. However, due to the unpredictability of the silence length, it is normally better to use short RTCP packets than long RTCP packets. This minimizes the impact of RTCP packet transmission on the RTP flow in case the RTCP packet is sent just before the silence period is over.

This approach may produce delay/loss of silence descriptor (SID) packets, but this fact has no significant negative impact on the speech quality. In addition, the impact of lost/delayed SID packets is really minimal as the RTP packet rate during silence periods is much smaller than 50 packets per second, and many of the transmission time interval slots are freely usable for RTCP data.

In an example of the present invention, the scheduling of RTCP packets can be modified, when necessary, as explained in the previous section in this way. When the voice activity detector 1.4 determines that there is a pause (silence period) in the speech, the rescheduling is performed. For example, in the control block 1.5, if there is a RTCP packet waiting for transmission and the transmission of such a packet is scheduled to happen at a future time, then the transmission of that RTCP packet is initiated, i.e. the RTCP packet is sent substantially immediately (or at any point of time during the silence period) after the silence period is detected. In addition to that, in this non-limiting example, if there is another RTCP packet waiting for transmission, the next RTCP packet is re-scheduled with a time offset from the just sent RTCP packet. This procedure can also be expressed as a pseudo code: If ((RTCP packet is scheduled at a future time) and (silence period occurs immediately)) then {RTCP packet is sent during the silence period; the next RTCP packet is re-scheduled with a time offset from the just sent RTCP packet}.

In accordance with a first embodiment of the present invention, when RTCP non-compound packets are used and the RTCP transmission interval for non-compound packets is too large, the non-compound packets may not be used at all, or used very rarely. If this is the case, the benefits of RTCP compound are almost null, but there is still the need of reporting to the sender important information (e.g., sender report (SR), receiver report (RR), session description protocol security descriptions for media streams (SDES), and application defined RTCP packet (APP) or other individual RTCP packets). Therefore, in order to guarantee the correct operation of RTCP, in accordance with an embodiment of the present invention, the apparatus and method of the present invention allow sending of any RTCP individual packet (not just APP packets for adaptation) as a non-compound RTCP packet in any possible order within a certain time interval (e.g., within a round trip time (RTT), or the RTCP transmission interval time). One possible example order is a cyclic order, in which it is sent an RTCP APP non-compound packet with some adaptation information, then it is sent an RTCP SR packet; and then it is sent an SDES packet. Other orders are possible.

Figure 5:
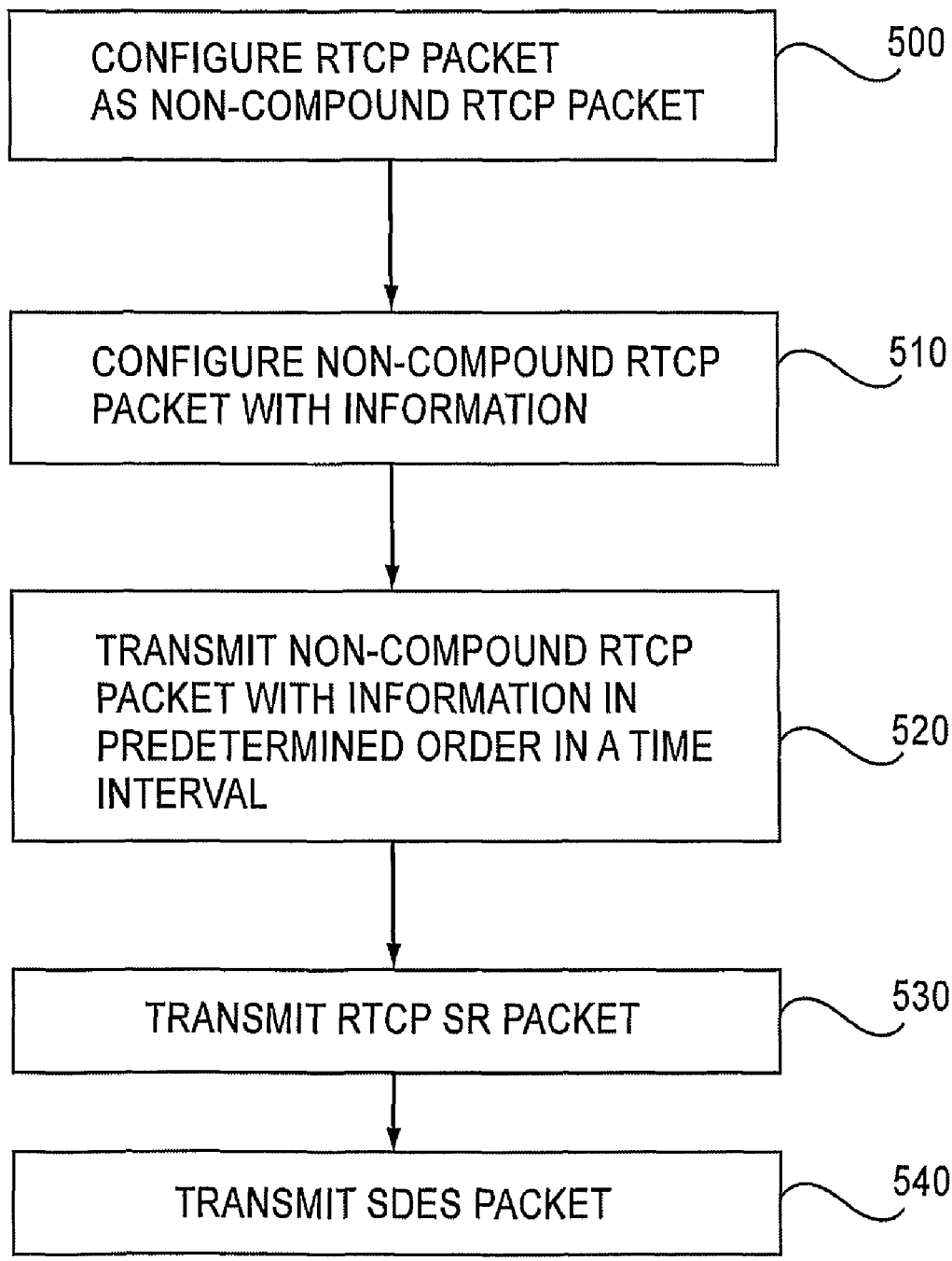
FIG. 5 illustrates a flow diagram of an RTCP configuration, in accordance with a first embodiment of the present invention.

FIG. 5 illustrates a flow diagram of an RTCP configuration, in accordance with a first embodiment of the present invention. At step 500, the method configures the RTCP packet as a non-compound RTCP packet. At step 510, the method configures the non-compound RTCP packet with reporting or adaptation information, including but not limited to, an SR, an RR, an SDES, an application defined RTCP packet (APP), or other individual RTCP packets. At step 520, the method transmits the non-compound RTCP packet with the information in a predetermined order within a certain time interval. The predetermined order may be configured as any possible order. At step 530, the method transmits an RTCP SR packet; and, at step 540, the method transmits an SDES packet. Other orders are possible.

In accordance with a second embodiment of the present invention, for multi-rate VoIMS sessions, that is, sessions where a speech codec can operate according to a certain number of modes (or bit-rates—for example an adaptive multi-rate (AMR) codec has eight modes corresponding to eight different bit rates), a bearer may be dimensioned to carry the highest of the modes. A one-to-one mapping between speech packets and data link layer frames can, therefore, be maintained. In order to maintain the same mapping for RTCP packets (or to limit the negative influence of the RTCP traffic on the RTP traffic), a limit on a size of RTCP packets can be established by the apparatus and method of the present invention. The limit on the size of the RTCP packet may be defined as the size of the RTCP packets (compound or non-compound) to be at most as large as N times the size of the speech packet size, where the size of the speech packet size may correspond to a highest of the speech codec modes used in the session (for instance, the highest of the speech codec mode or the highest of any used subset of the mentioned codec modes). A person of ordinary skill in the art will appreciate that other limits may be established for the size of the RTCP packet in relation to the size of the speech packet size. In accordance to an embodiment of the present invention, N can be, for example, two or more. The speech packet size may or may not include RTP/UDP/IP headers, and the RTP/UDP/IP headers may or may not be compressed.

Figure 6:
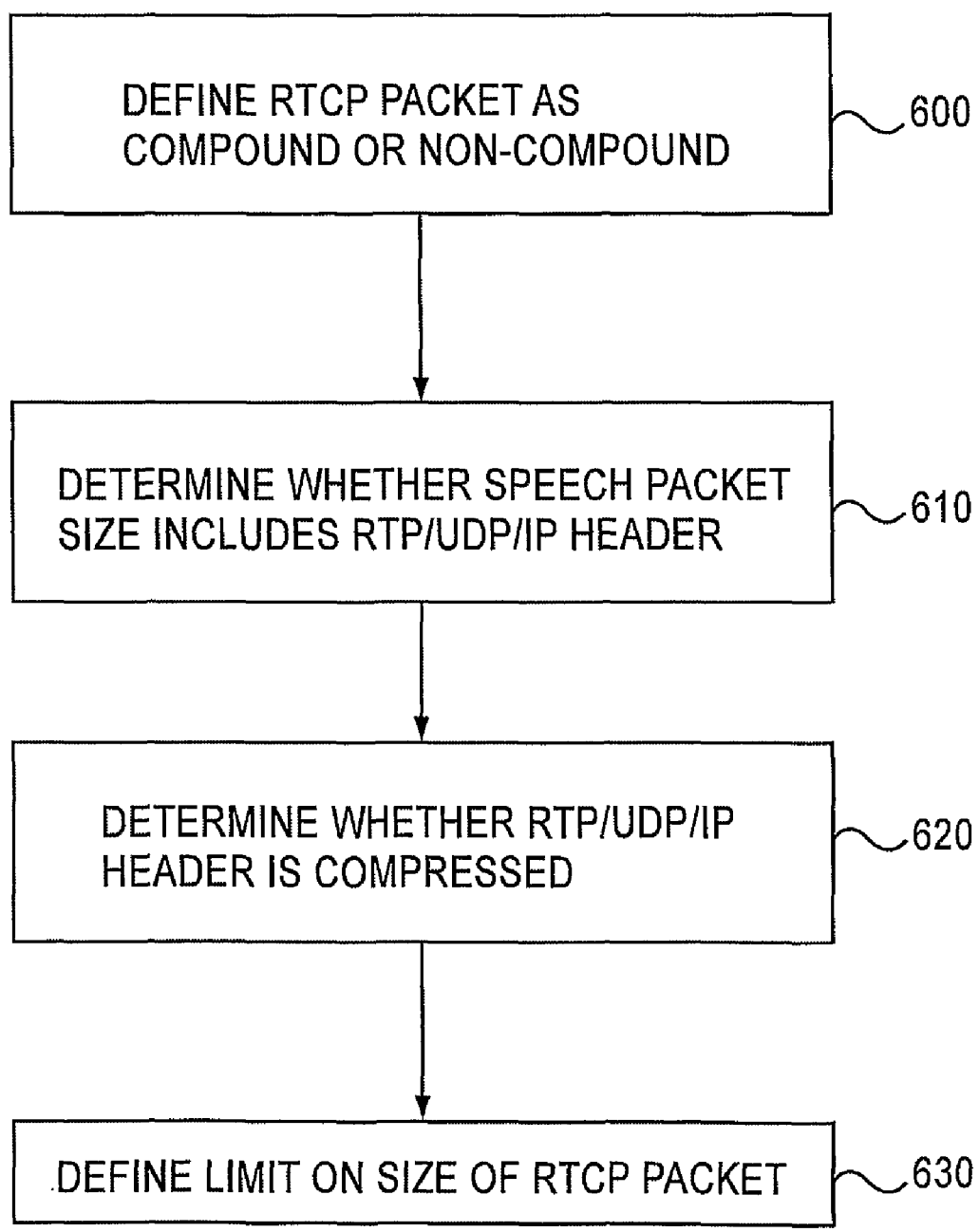
FIG. 6 illustrates a flow diagram limiting a size of an RTCP packet, in accordance with a second embodiment of the present invention.

FIG. 6 illustrates a flow diagram limiting a size of an RTCP packet, in accordance with the second embodiment of the present invention. At step 600, the method defines the RTCP packet as compound or non-compound. At step 610, the method determines whether the speech packet size includes RTP/UDP/IP headers. At step 620, if the speech packet size includes the RTP/UDP/IP headers, the method determines whether the RTP/UDP/IP headers are compressed. At step 630, the method defines a limit on the size of the RTCP packet to be at most as large as N times the size of the speech packet size, where the size of the speech packet size may correspond to a highest of the speech codec modes used in the session.

In accordance with a third embodiment of the present invention, an apparatus and method to verify a delivery of non-compound RTCP packet from a receiver to a sender terminal, is provided. The sender terminal, upon reception of an RTCP non-compound packet may respond to the receiver by inserting some type of information that serves as a positive acknowledgement (for instance, a confirmation binary flag, or a timestamp, a packet type of the just received non-compound packet, etc.) in the RTP and/or RTCP non-compound packets that may be sent to the receiver during the session. A positive acknowledgement in the information from the sender terminal to the receiver would be an indication that the sender terminal has received the RTCP non-compound packet. A person of ordinary skill in the art may appreciate that sender may repeat the sending of this positive acknowledgement in subsequent packets in order to guarantee that the receiver receives it even under bad radio conditions.

Figure 7:
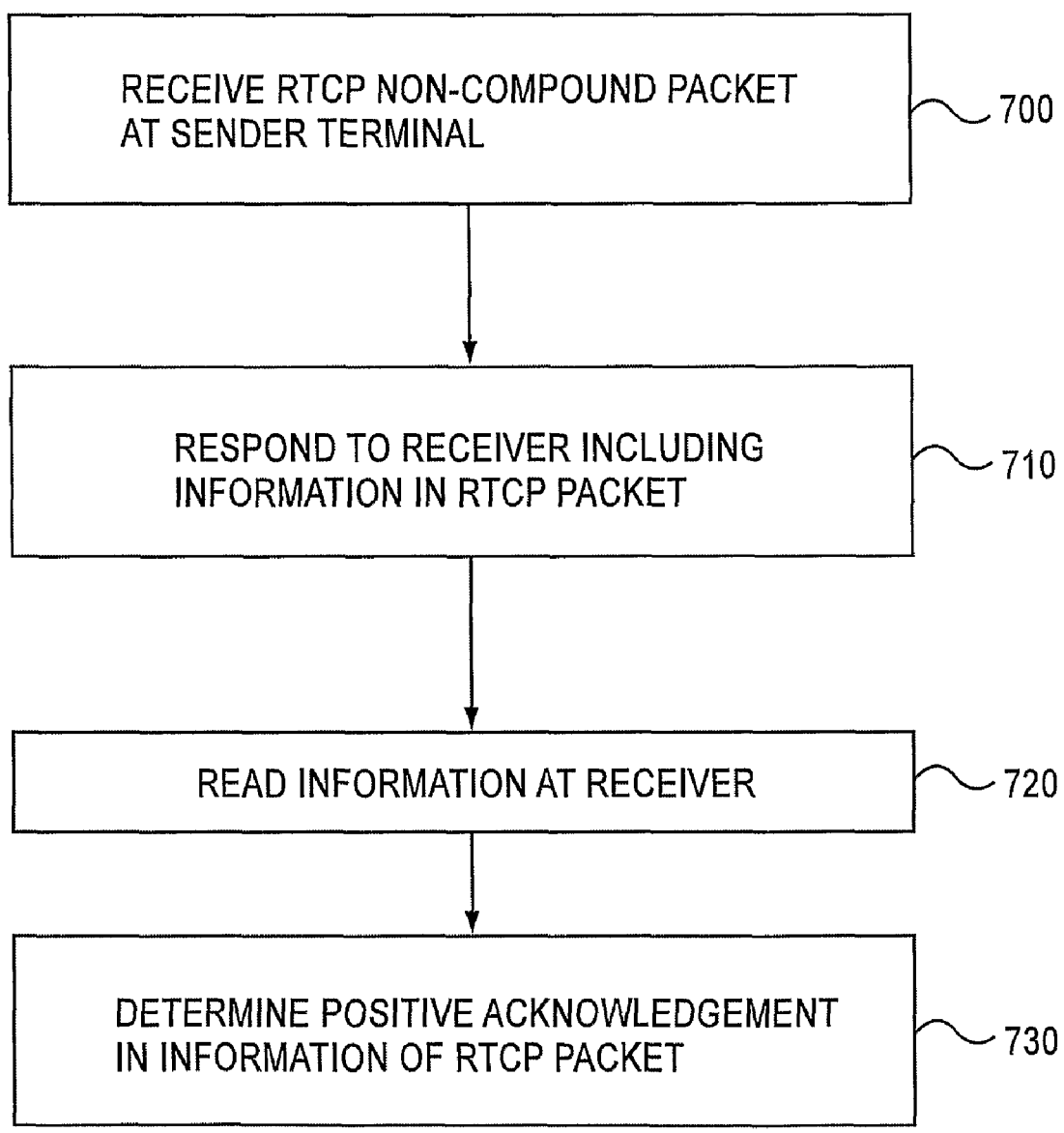
FIG. 7 illustrates a method to verify the delivery of non-compound RTCP packet from a receiver to a sender terminal, in accordance with a third embodiment of the present invention.

FIG. 7 illustrates a method to verify the delivery of non-compound RTCP packet from a receiver to a sender terminal, in accordance with the third embodiment of the present invention. At step 700, the method receives an RTCP non-compound packet at the sender terminal from the receiver. Upon reception of the RTCP non-compound packet, at step 710, the method may respond to the receiver by inserting some type of information in the RTP and/or RTCP non-compound packets that may be sent to the receiver from the sender terminal during the session. At step 720, the method reads the information in the RTP and/or RTCP non-compound packets. At step 730, the method determines that the information includes a positive acknowledgement from the sender terminal indicative that the sender terminal received the RTCP non-compound packet. A person of ordinary skill in the art may appreciate that sender may repeat the sending of this positive acknowledgement in subsequent packets in order to guarantee that the receiver receives it even under bad radio conditions. A person of ordinary skill in the art will appreciate that the apparatus and method illustrated in the third embodiment of the present invention may be performed in reverse. That is, the receiver may perform the functions described above performed by the sender and the sender may perform the functions described above performed by the receiver.

In accordance with a fourth embodiment of the present invention, if a bearer allows to send more than just a single individual non-compound RTCP packet, but the bearer does not allow to send the full compound RTCP packet (because of delay or losses reasons), an apparatus and method may be configured in which it would be possible to configure and use semi-compound RTCP packets, where at least two non-compound/individual RTCP packets (but less than all the non-compound/individual RTCP packets that would be sent as compound packet) are sent together (i.e., stacked) as a semi-compound RTCP packet.

Figure 8:
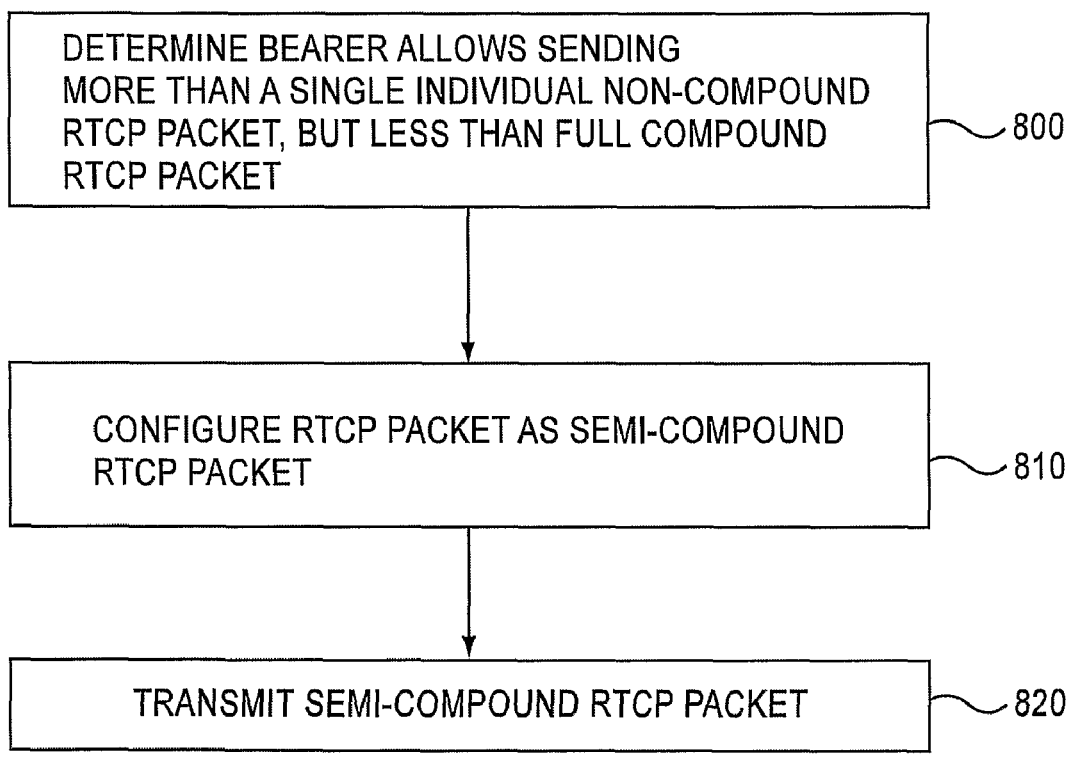
FIG. 8 illustrates a method to process semi-compound RTCP packets, in accordance with a fourth embodiment of the present invention.

FIG. 8 illustrates a method to process semi-compound RTCP packets, in accordance with the fourth embodiment of the present invention. At step 800, the method determines that the bearer allows sending more than just a single individual non-compound RTCP packet, but the bearer does not allow sending the full compound RTCP packet. At step 810, the method configures the RTCP packets as semi-compound RTCP packets including at least two non-compound/individual RTCP packets (but less than all the non-compound/individual RTCP packets that would be sent as compound packet). At step 820, the method transmits the semi-compound RTCP packets, where at least two non-compound/individual RTCP packets (but less than all the non-compound/individual RTCP packets that would be sent as compound packet) are sent together (i.e., stacked) for each semi-compound RTCP packet.

It is to be understood that in the embodiments of the present invention, the steps are performed in the sequence and manner as shown although the order of some steps and the like may be changed without departing from the spirit and scope of the present invention. In addition, the methods described in FIGS. 5-8 may be repeated as many times as needed.

Embodiments of the present invention can provide a guarantee that RTCP compound packets are limited in size, and that their size does not produce delays or losses because of the RLC layer operations. For efficiency reasons, this maximum size can be clearly defined. If the maximum size is defined, the impact of RTCP traffic on RTP traffic (delay or losses) can be better estimated and managed in a session.

Typically in AMR multi-rate operations, the bearer is dimensioned to carry the highest AMR mode in a session. With this reasonable assumption and with the goal of minimizing the size of RTCP compound packets, their size may be limited to be, for instance, three times the size of RTP packets used (in this case, the highest of the AMR modes used in the session gives the best estimate). Note that two times is a common case in practical scenarios, although the present invention is not limited to this scenario. This restriction limits the delay/packet loss effect of RTCP over RTP traffic.

If the minimum RTCP transmission interval is very large (for instance, ten seconds), then more weight may be placed on the non-compound RTCP packets. It is possible that only one compound RTCP packet is used at the beginning during a session, and after that, very rarely. This setting could be justified by the fact that a terminal implementation might wish to almost eliminate the use of compound RTCP packets, in order to reduce to zero the potential losses derived by RTCP compound packets.

In this case, there may be a problem of conveying the same information that RTCP compound packets are carrying, but using non-compound packets. Non-compound packets can be used not only to carry APP packets for adaptation, but also SR, RR and SDES packets. No doubt that the information contained in these packets is very useful to a session participant.

SR, RR and SDES packets may be carried over non-compound RTCP packets for example in a cyclic way. In practice, a compound RTCP packet may be fragmented and sent over several non-compound RTCP packets. If space allows (within the limits of RTCP packets) more than one non-compound RTCP packet can be stacked to form a semi-compound RTCP packet (smaller than a compound RTCP packet), to increase efficiency.

Sending SR, RR and SDES packets over non-compound RTCP packets allows conveying useful feedback that would be otherwise not carried, or carried much more infrequently and avoid losses derived by the usage of RTCP compound packets.

According to one embodiment of the invention, the method steps performed in FIGS. 5-8 may be performed by a computer program product embodied on a computer-readable medium, encoding instructions for performing at least the method described in FIGS. 5-8. The computer program product can be embodied on a computer readable medium. The computer program product can include encoded instructions for processing location configuration protocol determination flow, which may also be stored on the computer readable medium.

The computer program product can be implemented in hardware, software, or a hybrid implementation. The computer program product can be composed of modules that are in operative communication with one another, and which are designed to pass information or instructions to a communications device such as a user equipment or network node. The computer program product can be configured to operate on a general purpose computer or an application specific integrated circuit (ASIC).

Certain embodiments of the present invention offers advantages such as resolving the problem of an excessive length of compound RTCP packets, by fragmenting each compound RTCP packet in smaller non-compound packets and sending it spaced over time, which reduces or eliminates the problem of the packet losses generated by long RTCP packets. Embodiments of the present invention can guarantee that RTCP non-compound packets provide an equivalent functionality as the RTCP compound packets, because they provide the same information to the receiver (SR, RR, SDES, etc.), and the receiver is not lacking of any feedback information. The information may be provided spread in time, and not in a single compound packet.

The embodiments of the present invention can also remove or minimize the impact of the RTCP traffic over the RTP traffic, in terms of additional delay or losses. The embodiments of the present invention also allow, at least, the receiver to verify that its feedback sent over RTCP non-compound packets has really been received. Certain embodiments of the present invention further allow, at least, making maximum usage of the bearer capabilities. For example, if there is enough space (in a RLC frame) to send two RTCP compound packets together (but not enough space to send the full RTCP compound packet made of three non-compound packets), then these are sent as semi-compound RTCP packet.

In accordance with an embodiment of the present invention, the apparatus may include any type of controller, mobile or non-mobile network element including, but not limited to, a processor, a mobile station, a laptop, a user equipment, a wireless transmit/receive unit, a fixed or mobile subscriber unit, a mobile telephone, a computer (fixed or portable), a pager, a personal data assistant or organizer, or any other type of network element capable of operating in a wireless environment or having networking capabilities.

In addition, while the term data has been used in the description of the present invention, the invention has import to many types of network data. For purposes of this invention, the term data includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the spirit and scope of the invention. Further, since numerous modifications and changes will readily occur to those skilled in the art, it is not desired to limit the invention to the exact construction and step illustrated and described, and accordingly all suitable modifications and equivalents may be resorted to, falling within the scope of the invention.

I claim:

1. An apparatus, comprising:
   a controller configured to fragment a compound real-time transport control protocol packet into a plurality of non-compound real-time transport control protocol packets and to define one of the non-compound real-time transport control protocol packets as comprising at least one of a sender report, a receiver report and a session description protocol security description for media streams; and
   a transmitter configured to transmit the at least one non-compound real-time transport control protocol packet in a sample order within a defined interval.

2. The apparatus of claim 1, wherein at least one of the non-compound real-time transport control protocol packets further comprises at least one of an application defined real-time transport control protocol packet, or an individual real-time transport control protocol packet.

3. The apparatus of claim 1, wherein the defined time interval comprises a round trip time, a cyclic order, or a real-time transport control protocol interval time; and
   wherein the sample order comprises a cyclic order, which comprises an application defined real-time transport control protocol non-compound packet with some adaptation information, a real-time transport control protocol sender report packet, and a security description for media streams packet.

4. The apparatus of claim 1, wherein the controller is further configured to define a second packet as a real-time transport protocol packet; and
   wherein the transmitter is further configured to transmit the real-time transport protocol packet.

5. The apparatus of claim 4, wherein the real-time transport protocol packet is encapsulated in Internet protocol packet; and
   wherein the internet protocol packet comprises a plurality of real-time transport protocol packets.

6. The apparatus of claim 4, wherein the transmitter is further configured to transmit the non-compound real-time transport control protocol packet and the real-time transport protocol packet within a same packet data protocol context and radio bearer.

7. The apparatus of claim 4, wherein the real-time transport protocol packet comprises a fixed real-time transport protocol header, a list of contribution sources, and payload data, wherein the list of contributing sources can be empty.

8. The apparatus of claim 1, wherein the non-compound real-time transport control protocol packet is encapsulated in an internet protocol packet; and
   wherein the internet protocol packet comprises a plurality of non-compound real-time transport control protocol packets, as a compound real-time transport control protocol packet.

9. A method, comprising:
   fragmenting a compound real-time transport control protocol packet into a plurality of non-compound real-time transport control protocol packets;
   defining one of the plurality of the non-compound real-time transport control protocol packets to comprise at least one of a sender report, a receiver report and a session description protocol security description for media streams; and transmitting the non-compound real-time transport control protocol packets in a sample order within a defined time interval.

10. The method of claim 9, wherein at least one of the non-compound real-time transport control protocol packets further comprises at least one of an application defined real-time transport control protocol packet, or an individual real-time transport control protocol packet.

11. The method of claim 9, wherein the defined time interval comprises a round trip time, a cyclic order, or a real-time transport control protocol interval time; and wherein the sample order comprises a cyclic order, which comprises an application defined real-time transport control protocol non-compound packet with some adaptation information, a real-time transport control protocol sender report packet, and a security description for media streams packet.

12. The method of claim 9, further comprising: generating a real-time transport protocol packet; and transmitting the real-time transport protocol packet.

13. The method of claim 12, wherein the real-time transport protocol packet is encapsulated in an internet protocol packet; and wherein the internet protocol packet comprises a plurality of real-time transport protocol packets.

14. The method of claim 12, wherein the transmitting further comprises transmitting the non-compound real-time transport control protocol packet and the real-time transport protocol packet within a same packet data protocol context and radio bearer.

15. The method of claim 12, wherein the real-time transport protocol packet comprises a fixed real-time transport protocol header, a list of contribution sources, and payload data, wherein the list of contributing sources is capable of being empty.

16. The method of claim 9, further comprising encapsulating the non-compound real-time transport control protocol packet in an internet protocol packet; and wherein the internet protocol packet comprises a plurality of non-compound real-time transport control protocol packets, as a compound real-time transport control protocol packet.

17. A non-transitory computer-readable medium that contains a computer program, the computer program is executed by a processor to implement a method, the method comprising:

fragmenting a compound real-time transport control protocol packet into a plurality of non-compound real-time transport control protocol packets;

defining one of the plurality of the non-compound real-time transport control protocol packets to comprise at least one of a sender report, a receiver report and a session description protocol security description for media streams; and transmitting the non-compound transport control protocol packet in a sample order within a defined time interval.

18. The non-transitory computer-readable medium of claim 17, wherein at least one of the non-compound real-time transport control protocol packets further comprises at least one of an application defined real-time transport control protocol packet, or an individual real-time transport control protocol packet.

19. The non-transitory computer-readable medium of claim 17, wherein the defined time interval comprises a round trip time, a cyclic order, or a real-time transport control protocol interval time; and wherein the sample order comprises a cyclic order, which comprises an application defined real-time transport control protocol non-compound packet with some adaptation information, a real-time transport control protocol sender report packet, and a security description for media streams packet.

20. The non-transitory computer-readable medium of claim 17, wherein the method further comprising:

generating a second packet as a real-time transport protocol packet; and transmitting the real-time transport protocol packet.

* * * * *

UNITED STATES PATENT AND TRADEMARK OFFICE
CERTIFICATE OF CORRECTION

PATENT NO.        : 8,391,284 B2
APPLICATION NO.   : 12/597223
DATED             : March 5, 2013
INVENTOR(S)       : Igor Danilo Diego Curcio It is certified that error appears in the above-identified patent and that said Letters Patent is hereby corrected as shown below:

In the Claims:

In Claim 4:
Column 14, line 34, "a second packet as" should be deleted.

In Claim 15:
Column 15, lines 35-36, "is capable of being" should be deleted and -- can be -- should be inserted.

Signed and Sealed this
Thirtieth Day of April, 2013

Teresa Stanek Rea
*Acting Director of the United States Patent and Trademark Office*